United States Patent [19]

Schwarz et al.

[11] Patent Number: 5,362,399
[45] Date of Patent: Nov. 8, 1994

[54] REMOVAL OF WATER FROM A PHOSGENE RECYCLE STREAM

[75] Inventors: Hans V. Schwarz, Baton Rouge, La.; Erwin Brunner, Weinheim, Germany

[73] Assignee: BASF Corporation, Parsippany, N.J.

[21] Appl. No.: 998,491

[22] Filed: Dec. 30, 1992

[51] Int. Cl.$^5$ .............................................. B01D 15/04
[52] U.S. Cl. ..................... 210/689; 560/347
[58] Field of Search ....................... 210/689, 749, 765; 560/347, 352

[56] References Cited

U.S. PATENT DOCUMENTS

| | | | |
|---|---|---|---|
| 3,367,889 | 2/1968 | Oline | 260/2.1 |
| 3,928,542 | 12/1975 | Bakay | 423/342 |
| 4,101,577 | 7/1978 | Smathers | 260/561 R |
| 4,221,871 | 9/1980 | Meitzner et al. | 521/29 |
| 4,745,216 | 5/1988 | Keggenhoff et al. | 560/347 |

FOREIGN PATENT DOCUMENTS

3333720C2  6/1987  Germany.

OTHER PUBLICATIONS

Kunin, Robert et al., "Communications to the Editor," vol. 84, pp. 305–306 (Jan. 20, 1962).

*Primary Examiner*—Ivars Cintins
*Attorney, Agent, or Firm*—Dennis V. Carmen

[57] ABSTRACT

The invention relates to a process for removing water traces from a liquid phosgene stream in chemical processes which employ a phosgenation step. Water traces are removed from a liquid phosgene stream containing at least 60 weight percent phosgene by contacting the stream with a strongly basic macroreticular anion exchange resin which catalyzes the reaction between phosgene and the water traces.

15 Claims, No Drawings

REMOVAL OF WATER FROM A PHOSGENE RECYCLE STREAM

FIELD OF THE INVENTION

The present invention relates to a process for removing water traces from a phosgene stream in chemical processes which employ a phosgenation step, such as in the manufacture of organic polyisocyanates like toluene diisocyanate (TDI), and more particularly to contacting a phosgene recycle stream with a strongly basic anion exchange resin to catalyze the reaction between water and phosgene, thus removing even trace amounts of water.

BACKGROUND OF THE INVENTION

Many of the organic polyisocyanates currently commercialized are manufactured in a phosgenation process. For example, TDI may be manufactured by contacting in a reaction zone toluene diamine (TDA) with an excess of phosgene ($COCl_2$) in the presence of a solvent. The products of the reaction between TDA and $COCl_2$ are TDI and hydrogen chloride. Most of the hydrogen chloride is a vapor removed at the overhead of the reaction column for collection and eventual sale as aqueous hydrochloric acid. Excess phosgene is also removed from the reaction column. The bottoms in the reaction column, comprised of solvent, TDI, remaining $COCl_2$, and small amounts of HCl and byproducts flow through one or several distillation towers in which the majority of $COCl_2$ is removed, condensed, and eventually recycled back to the reaction zone. In the distillation of $COCl_2$, other impurities are also vaporized and caught in the $COCl_2$ stream, such as solvent, byproducts, water, and HCl, which are desirably removed prior to recycling $COCl_2$ to the reaction zone.

In one process, phosgene-containing vent gases, along with other impurities such as HCl, are collected from the various sources and fed into an absorption tower. This phosgene stream is washed down in the absorption tower with toluene allowing HCl and other gases to vent off at the overhead of the tower, thus removing the vast majority of HCl. The phosgene-loaded toluene stream then may enter a phosgene stripper tower where phosgene is stripped by heat from the toluene. The stripped phosgene stream is fractioned at a sidedraw or the overhead of the tower as a liquid flowing through coolers to drums for re-use back in the reaction zone. The liquid phosgene stream drawn from the stripping tower, or for that matter from any source, is termed herein as a "liquid phosgene stream" and comprises at least 60 weight percent phosgene, preferably at least 80 weight percent, more preferably at least 84 weight percent. The remainder of the liquid phosgene stream comprises one or more solvents, such as monochlorobenzene, dichlorobenzene, toluene, benzene, xylene, methylchloride, methylene chloride, chloroform, carbon tetrachloride, ethyl chloride, dichloroethane, trichloroethane, dichloropropane, esters and diesters of aliphatic and aromatic carboxylic and dicarboxylic acids having less than 20 carbon atoms, aliphatic ethers having less than 10 carbons, and trace amounts of water and HCl.

The water traces unavoidably enter the process through their presence in the toluene used for washing, through raw materials such as the solvent for phosgenation or the toluenediamine (TDA), and/or through non-airtight joints which can develop at various locations in the process, for example, in vacuum parts of the plant. It is the presence of these trace amounts of water in a recycle phosgene stream which presents various problems. Applicants have found that the traces of water in the process present at least three distinct and interrelated problems. Traces of water in the reaction zone react with TDI to form urea byproducts, thus lowering the TDI yield. Similar losses occur in other phosgenation processes. Second, the urea byproducts must be disposed of which increases chemical wastes. Third, the presence of water will render the otherwise dry HCl in various plant sections corrosive, thereby degrading the metal walls of equipment like the phosgenation reactor, heat exchangers, separation columns, which come in contact with the HCl. These trace amounts of water translate into several pounds of water per hour based on a liquid phosgene recycle rate of a few to several hundred tons per hour. Therefore, it is highly desirable to reduce the amount of water in a liquid phosgene stream prior to entry into the reaction zone.

Typically, water reacts spontaneously with phosgene forming HCl and carbon dioxide products at high water concentrations. However, the amount of water in a typical liquid phosgene recycle stream is so low-on the order of 200 ppm to 1,500 ppm—that the reaction proceeds only very slowly, if at all. It has been proposed in DE 3333720 C2 to employ a special anionic exchanger whose structural properties and manufacture are also claimed in the patent to remove water traces from a solvent recycle stream containing a predominant amount of solvent and low levels of phosgene. This reference, however, does not address the problem of water contamination in a phosgene recycle stream, predominantly comprised of phosgene, but rather identifies the solvent stream as the source of water contamination.

SUMMARY OF THE INVENTION

It is an object of the invention to reduce traces of water in a process for phosgenating TDA, MDA (methylene bisphenyldiamine), other isocyanate precursors, and in other phosgenation processes like those for chloroformic acid and esters thereof, carboxylic acid chlorides and more. This object has been partially met by discovering that the major source of water contamination entering a phosgenation reaction zone are from a liquid phosgene recycle stream. As a means of reducing water traces, a liquid phosgene stream is run across a macroreticular strong basic anionic exchange resin which catalyzes the reaction between the water traces and a portion of the phosgene releasing HCl and $CO_2$ gases. The invention advantageously improves the yield of isocyanate, or the respective product produced in the plant, results in reduced wastes, and preserves the life of equipment coming in contact with the HCl byproduct.

DETAILED DESCRIPTION OF THE INVENTION

In the process of the invention, the liquid phosgene stream is run across a macroreticular strongly basic quaternary anionic exchanger resin before being recycled back to the reaction zone in which phosgenation of TDA, MDA, other isocyanate precursors, or precursors of other phosgenation products, takes place. By so doing, approximately 90 percent, preferably 95 percent or more, of the water present in the liquid phosgene stream is removed. The stream contains less than 50 ppm of water, preferably less than 25 ppm, more preferably about 10 ppm or less after contacting the resin. The reaction between the excess phosgene in the stream and the water traces proceeds at ambient temperatures according to the equation:

$$COCl_2 + H_2O \xrightarrow{cat} 2HCl + CO_2$$

The anionic exchange resin employed to catalyze this reaction is any macroreticular resin having attached to a crosslinked copolymer a quaternary ammonium group as follows:

CROSSLINKED COPOLYMER

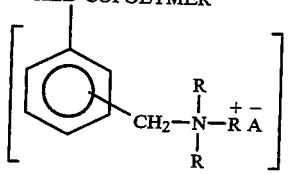

wherein each of R is independently a $C_1$ to $C_{22}$ alkyl or alkenyl group, preferably a methyl or ethyl group, which may be unsubstituted or substituted with, for example, an OH group, and where A is any anion such as a halide, hydroxyl, alcoholate, but is preferably a chloride.

Strongly basic anionic exchange resins and their methods of preparation are well known and described in U.S. Pat. Nos. 4,101,577 and 2,591,573. A mono-olefinically unsaturated monomer is copolymerized with a polyolefinically unsaturated monomer in the presence of a monomer solvent. The polyolefinically unsaturated monomer acts as the crosslinking agent so that the amount of this monomer added will correlate to the crosslinking density. The amount of crosslinking monomer is from 2 weight percent to 30 weight percent, preferably from about 8 weight percent to 25 weight percent based upon the total weight of the monomers employed.

Mono-olefinically unsaturated monomers include acrylic acid, methacrylic acid, methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, styrene, 4-chlorostyrene, 3-chlorostyrene, vinyltoluene, vinylnaphthalene, vinylpyridine, 2-methyl-5-vinylpyridine, 2-ethyl-5-vinylpyridine, 3-methyl-5-vinylpyridine, 2,3-dimethyl-5-vinylpyridine, and 2,methyl-3-ethyl-5-vinyl-pyridine, 2-methyl-5-vinylquinoline, 4-methyl-4-vinylquinoline, 1-methyl- or 3-methyl-5-vinylisoquinoline, N-vinylcaprolactam, N-vinylbutyrolactam, and the like. It is also possible to being with a copolymer of the above mono-olefinically unsaturated monomers with other mono-olefinically unsaturated compounds such as dialkyl maleates, dialkyl fumarates, dialkyl crotonates, dialkyl itaconates, and dialkyl glutaconates.

Polyethylenically unsaturated compounds include the following: 1,4-divinylbenzene, divinylpyridine, divinyltoluenes, divinylnaphthalenes, diallyl phthalate, ethylene glycol diacrylate, ethylene glycol dimethacrylate, 1,3-butanediol dimethacrylate, divinylxylene, divinylethylbenzene, divinylsulfone, polyvinyl or polyallyl ethers of glycol, of glycerol, of pentaerythritol, of mono- or dithio- derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N-methylenedimethacrylamide, N,N'-ethylenediacrylamide, 1,2-di)α-methylmethylene sulfonamido)ethylene, trivinylbenzene, trivinylnaphthalene, and polyvinylanthracenes. A preferred mono-olefinically unsaturated monomer is styrene; and a preferred polyolefinically unsaturated monomer is divinylbenzene, trivinylbenzene, and ethylene glycol methacrylate.

To initiate crosslinking, the copolymerization is carried out in the presence of a free radical catalyst such as benzoyl peroxide, cumene peroxide, acetyl peroxide, methylethylketone peroxide, azo catalysts, and alkali metal and ammonium persulfates, in an amount of from 0.1 weight percent to 2 weight percent of all monomers present.

The formed copolymer is chloromethylated in the para- and/or meta- position by reacting the copolymer resin with chloromethyl methyl ether in the presence of a Friedel-Crafts catalyst. The chloromethylated copolymer is then aminated by reacted with a dissolved tertiary amine in the presence of a Friedel-Crafts catalyst, such as aluminum chloride or stannous chloride, to form the ammonium salt group:

CROSSLINKED COPOLYMER

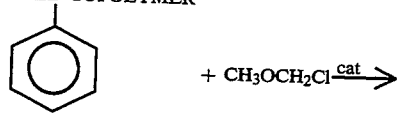

CROSSLINKED COPOLYMER

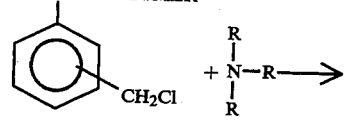

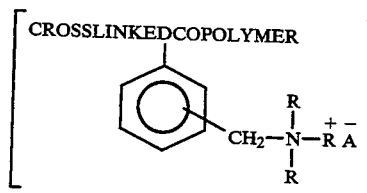

A wide variety of amines may be used to form the quaternary ammonium salt group. Suitable examples include the amines used to form the quaternary ammonium salt groups described in U.S. Pat. No. 4,107,099, incorporated herein by reference; and the more common amines, such as trimethylamine, triethylamine, tripropylamine, and the amino alcohols such as dimethylaminoethanol. Preferred are trimethylamine and the amino dimethylaminoethanol. Thus, a preferred structure is a styrene-divinylbenzene backbone having quaternary ammonium salts of chlorine groups attached through a methylene group according to the following structure:

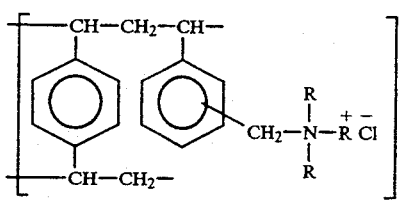

where each of R is methyl, or at least one of R is an alkylhydroxy group such as a hydroxyethyl group. Commercially available macroreticular strongly basic anionic exchange resins are sold under the names Amberlyst® A-26, A-27, and A-29, Amberlite® IRA-400, -401, -402, -410, and -911, trade names of Rohm S. Haas Co., Philadelphia, Pa., Duolite A-101-D, -102-D, and Duolite ES-111, trade names of Diamond Alkali Co., Redwood, Calif.; and Dowex 11 and Dowex 21K, trade names of The Dow Chemical Co., Midland, Mich.

The anionic exchange resin used in the invention has a macroreticular pore structure as is commonly understood in the art and defined in U.S. Pat. No. 3,037,052. The macroreticular structure comprises a series of microchannels formed when the precipitant solvent during copolymerization is squeezed out of the growing insoluble copolymer mass. The resin is in the form of particles, preferably spheres having a mesh size of from about 20–50. It is preferred to use spherical particles having about 35–45 pcf densities, an average pore diameter of 200–800 Angstroms, more preferably 400–700 Angstroms, an ion exchange capacity in weight of 2.3 to 5.0, more preferably 2.7 to 4.4 most preferably 4.1 to 4.4 meq/g, and a surface area of from 20 to 50 m²/g, more preferably 25 to 45 m²/g.

The process of water removal from a phosgene stream can be carried out batchwise or continuously, preferably continuously. Since the anionic exchange resin is insoluble in the recycle phosgene stream, the recycle phosgene stream may be continuously passed through a fixed resin bed. The preferred manner of water removal is accomplished by directing the liquid recycle phosgene stream through the bottom of the anion exchange resin bed to flow upward. As the liquid recycle phosgene stream is passed through the resin bed, the anionic exchanger catalyzes the reaction between the phosgene and trace water, forming HCl and $CO_2$ gaseous byproducts. These byproducts may be vented in a gas headspace over the catalyst bed through a pressure control system. The purified liquid phosgene stream overflows above the catalyst bed to a storage tank or directly back to the phosgenation reactor.

The catalyzed reaction in the resin bed is carried out at temperatures of from $-25°$ C. to $100°$ C., preferably $10°$ C. to $80°$ C., more preferably $20°$ C. to $50°$ C. The flow rate of liquid recycle phosgene through the resin bed is any rate suitable for the flow rates in an existing recycle phosgene stream, including 0.1 to 100 times the resin bed volume per hour and at any pressure desired, preferably slightly above the vapor pressure of the liquid phosgene stream at the particular temperature. For example, at $20°$ C. a suitable pressure would be about 20 to 30 psig. The flow rate is limited at the upper end only by providing a sufficiently long residence time to allow removal of water traces from the liquid recycle phosgene stream. It has been verified that the residence time can be adjusted to as low as 1.7 minutes in a phosgene stream containing 1000 ppm water without detection of over 50 ppm water in the resulting purified phosgene stream, although it has not been verified if this is a lower limit. It is preferable that the residence time of the phosgene stream over the exchange resin be ten minutes or less, more preferably two minutes or less, most preferably one minute or less, with less than 50 ppm water remaining in the purified phosgene stream.

The present process for removing water from a phosgene stream is applicable to processes for manufacturing isocyanates such as diphenylmethane diisocyanate (MDI), polyphenylene polymethylene polyisocyanate (polymeric-MDI), hexamethylene diisocyanate (HDI or HMDI), isophoronediisocyanate (IPDI), other isocyanates, chloroformates, carboxylic acid chlorides, or chlorocarbonic acid esters, where a predominant amount of phosgene, greater than 60 weight percent, is present in a liquid phosgene stream.

EXAMPLE 1

This experiment was conducted to determine whether a macroreticular strongly basic anion exchange resin would remove traces of water from a stream containing a predominant amount of phosgene. The macroreticular strongly basic anionic exchanger employed was Amberlyst® A-26, from Rohm S. Haas Company marketed by SERVA, which has as the active group $-N(CH_3)_3^{\oplus}$ and $Cl^{\ominus}$ as the anion, a 20–50 mesh, porosity of 27 percent, a specific surface area of 28 m²/g, and a water content of 61 percent. The other raw materials were 99 percent pure phosgene, 99 percent pure ethylchloride representing the presence of a minor amount of an organic solvent, and deionized water in the amounts stated below.

A pressure resistant glass reactor tube having a 100 cm³ volume and a 50 cm length was partially filled with 66 g of Amberlyst® A-26. About 40 cm from the inlet of the glass reactor tube was filled with the resin, while the remaining top 10 cm of the glass reactor tube toward the outlet was filled with glass pearls. The phosgene, ethyl chloride, and water ingredients were individually metered and pumped into the bottom inlet of the glass reactor tube at the flow velocities indicated below in Table 1 for each ingredient. The pressure was measured at the liquid/gas outlet of the tube with a manometer and kept at a constant 3–4 bars at the outlet with an overflow valve. The liquid/gas outlet of the reactor tube was fed into a 400 cm³ glass vessel where the phosgene stream was permitted to expand into a gas at $70°$ C. The gases from the glass vessel were fed through an on-line water detector (based on electrical conductivity of a dry phosphoric acid film in the presence of water vapor) having a water detection limit of 50 ppm. Beyond the water analyzer the gases were removed over a flow meter and into two scrubber flasks filled with aqueous KOH.

As a control sample, water was dosed into the system beyond the glass tube reactor and beyond the overflow valve at the outlet of the glass tube. This also served to calibrate the water detector. For control samples without water, the flow from the water source was shut off so that only phosgene and ethyl chloride ran through the system. In samples run without water, the water detector displayed from 15 to 40 ppm water, meaning the detector could not detect the presence of water below 40 ppm. In samples run with 0.16 g/Kg water dosed beyond the glass tube reactor, the water detector displayed 2,600 ppm water.

TABLE 1

| SAMPLE | FLOW VELOCITY g/h | | | RESIDENCE TIME[a] (min) |
|---|---|---|---|---|
| | PHOSGENE | ETHYL-CHLORIDE | WATER | |
| 1 | 164 | 0 | 0 | 40 |
| 2 | 164 | 0 | 0.27 | 40 |
| 3 | 164 | 0 | 0.52 | 40 |
| 4 | 164 | 0 | 0.12 | 40 |
| 5 | 164 | 24 | 0.56 | 33 |
| 6 | 164 | 24 | 1.12 | 32 |
| 7 | 330 | 48 | 0.56 | 16 |
| 8 | 493 | 72 | 0.56 | 11 |

[a] Based on 80 cm³ of an empty reactor.

In all of the samples, no water was detected by the water detector indicating that less than 50 ppm was present in the purified phosgene stream.

EXAMPLE 2

This experiment was performed to determine whether water could be successfully removed from a phosgene stream at reduced residence times and for extended periods of time. In this experiment, an 18 cm³ glass tube reactor having a 36 cm length was filled with 9 cm³ of Amberlyst ® A-26 with a resulting 18 cm long resin bed. The remainder was filled with glass pearls.

The individual feed streams of phosgene, ethylchloride, and water were combined as in Example 1 at the inlet and run through the catalyst bed. The volumetric flow rates of the streams were 0.40 cm³/hr (0.40 g/hr) of water, 75 cm³/hr (66.8 g/hr) of ethylchloride, and 240 cm³/hr (328.8 g/hr) of phosgene. The glass tube reactor feed comprised 1,000 ppm water and was run for 20 hours at a residence time of 1.7 minutes. No water was detected beyond the outlet of the glass reactor tube indicating that less than 50 ppm water was present in the phosgene stream after running it through the resin bed.

What we claim is:

1. A process for removing water from a liquid phosgene stream containing 60 weight percent or more of liquid phosgene, comprising manufacturing an isocyanate with phosgene in the presence of a solvent, removing gaseous phosgene from the isocyanate and solvent, liquefying the gaseous phosgene to form said liquid phosgene stream, and contacting the liquid phosgene stream with a macroreticular strongly basic anionic exchange resin having a quarternary ammonium group attached to a crosslinked copolymer through a methylene group according to the formula:

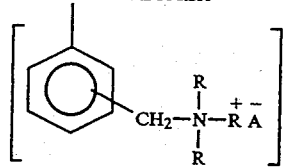

wherein each of R independently comprise a substituted or unsubstituted $C_1$ to $C_{22}$ alkyl or alkenyl group, and $A^-$ comprises a halide, hydroxide, or alcoholate.

2. The process of claim 1, wherein the phosgene stream contains less than 50 ppm water after being passed over the resin.

3. The process of claim 2, wherein the residence time of the phosgene stream over the resin is ten minutes or less.

4. The process of claim 3, wherein the residence time is two minutes or less.

5. The process of claim 2, wherein the phosgene stream after contacting the resin is recycled for use in the manufacture of isocyanates, chloroformates, carboxylic acid chlorides, and chlorocarboxylic acid esters.

6. The process of claim 5, wherein the phosgene stream after contacting the resin is recycled for use in the manufacture of toluene diisocyanate, diphenylmethane diisocyanate, or polyphenylene polymethylene polyisocyanate.

7. The process of claim 2, wherein the phosgene stream contains less than 25 ppm water after being passed over the resin.

8. The process of claim 7, wherein the phosgene stream contains less than 10 ppm water after being passed over the resin.

9. The process of claim 1, wherein 95 weight percent or more of water present in the phosgene stream is removed after contacting the resin.

10. The process of claim 1, wherein each of R is a methyl group.

11. The process of claim 1, wherein A is a chloride ion.

12. The process of claim 1, wherein at least one of R is an alkylhydroxy group.

13. The process of claim 1, wherein the crosslinked copolymer is obtained by copolymerizing a mono-olefinically unsaturated monomer with a polyolefinically unsaturated monomer in the presence of a monomer solvent to yield a macroreticular structured particle.

14. The process of claim 13, wherein from 8 weight percent to 25 weight percent of the polyolefinically unsaturated monomer is copolymerized with the mono-olefinically unsaturated monomer based upon the total weight of the monomers.

15. The process of claim 14, wherein the polyolefinically unsaturated monomer is divinylbenzene and the mono-olefinically unsaturated monomer is styrene.

* * * * *